Aug. 24, 1965          J. S. GOLIGHTLY          3,202,497

GLASS BENDING MOLD WITH A HEAT ABSORBER

Original Filed May 16, 1958          4 Sheets-Sheet 1

INVENTOR
JAMES S. GOLIGHTLY

Oscar L. Spencer
ATTORNEY

Aug. 24, 1965 J. S. GOLIGHTLY 3,202,497
GLASS BENDING MOLD WITH A HEAT ABSORBER
Original Filed May 16, 1958 4 Sheets-Sheet 2

INVENTOR
JAMES S. GOLIGHTLY
BY *Ozark Spencer*
ATTORNEY

INVENTOR
JAMES S. GOLIGHTLY
Oscar L. Spencer
ATTORNEY

Aug. 24, 1965  J. S. GOLIGHTLY  3,202,497
GLASS BENDING MOLD WITH A HEAT ABSORBER
Original Filed May 16, 1958  4 Sheets-Sheet 4
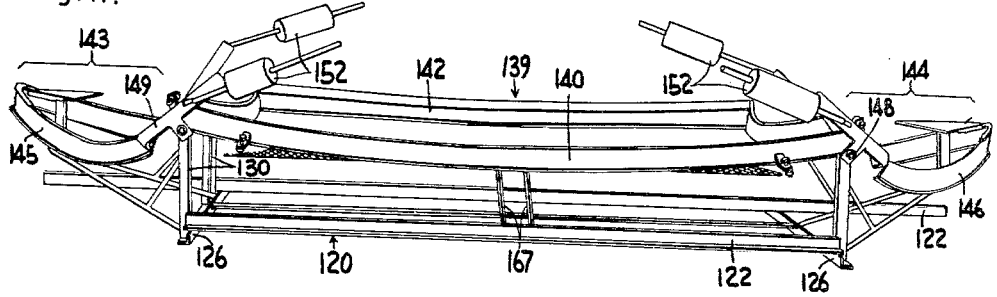
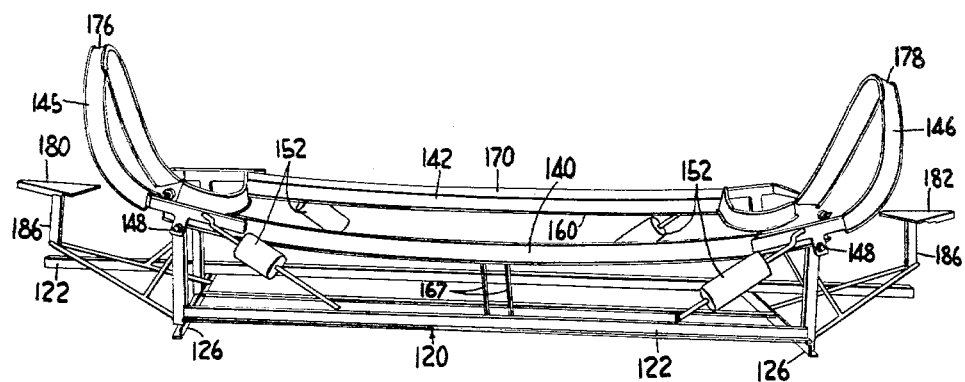
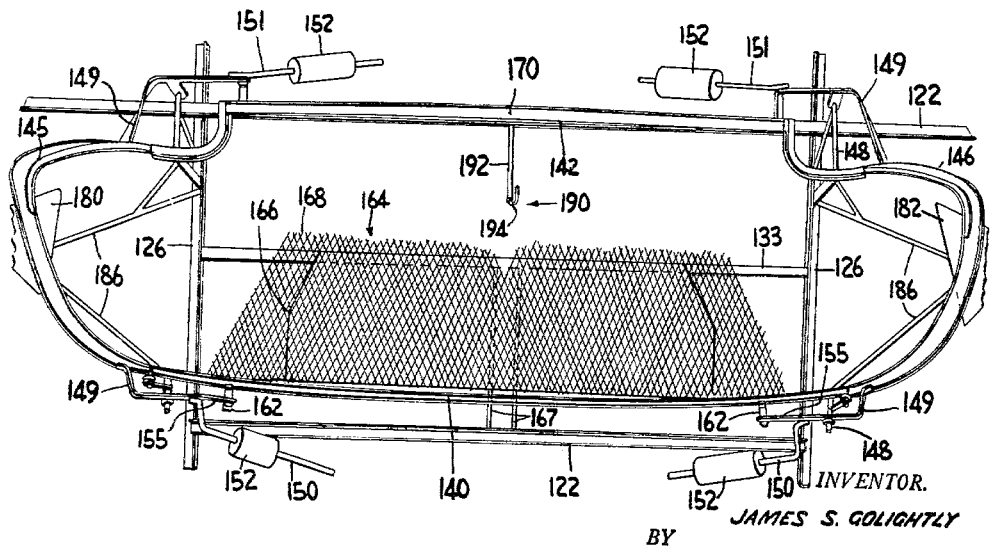
INVENTOR.
JAMES S. GOLIGHTLY
BY Oscar L. Spencer
ATTORNEY United States Patent Office 3,202,497
Patented Aug. 24, 1965

3,202,497
GLASS BENDING MOLD WITH A HEAT ABSORBER
James S. Golightly, Pittsburgh, Pa., assignor to Pittsburgh Plate Glass Company, Pittsburgh, Pa., a corporation of Pennsylvania
Original application May 16, 1958, Ser. No. 735,736. Divided and this application May 16, 1963, Ser. No. 281,002
8 Claims. (Cl. 65—288)

The present case is a division of application Serial No. 735,736 of James S. Golightly, filed May 16, 1958, now abandoned for Bending Glass Sheets, which is a continuation-in-part of application Serial No. 438,016 of James S. Golightly and Wiliam C. McRoberts, filed June 21, 1954, Patent No. 2,876,595 issued March 10, 1959, entitled Glass Bending Molds and of application Serial No. 649,208 of James S. Golightly, filed March 28, 1957, entitled Bending Glass Sheets.

Conventionally, sheets of flat glass have been bent into desired windshield patterns by cutting the flat sheets into the shape desired for the finished product, supporting the sheets in pairs upon a bending mold, and gradually heating the glass and the mold to avoid thermal shock, thus softening the glass. The glass, softened by heat, conforms to the curvature of the mold.

Due to the increased size and complexity of curved windshields presently desired by automobile manufacturers, it has become necessary to complicate the structure of molds required to bend glass sheets. A typical example of a complex curvature required is a windshield bent to a comparatively shallow curvature in its central portion merging into regions of rapidly reducing radii of curvature to form opposing wing sections. Such windshields are known in the art as "wrap-around" windshields. Further complicated structures involve the so-called "twin wrap" windshield in which the windshield is not only bent longitudinally but also is provided with a transverse localized bend near one side edge of the windshield to form an auxiliary portion that extends into the roof of the vehicle.

Prior art bending molds have attempted to use shields interposed between a source of heat and a portion of a flat glass sheet to be maintained relatively flat. Pearse et al. Patent No. 2,450,297, Paddock et al. Patent No. 2,452,488, and Bamford et al. Patent No. 2,646,647 show typical constructions of this type. However, when such molds are employed to bend glass sheets in pairs to non-uniform curvatures by shielding the relatively flat portions, the upper sheet of the pair softens less readily than the bottom sheet and intimate contact between the sheets is lost. Gaps remain between critical portions of the bent pair of sheets. These gaps are so great that they cannot be removed by laminating the glass sheets to opposite surfaces of a plastic interlayer. The same problem arises when employing shields both above and below the critical portions of a glass sheet, as depicted in Bamford et al. Patent No. 2,646,647 and Boyles et al. Patent No. 2,348,278, in attempts to bend a pair of aligned glass sheets simultaneously.

According to the present invention, special molds are provided for bending glass sheets in pairs to produce these unique bends while avoiding gaps between the facing surfaces of the sheets of the pair. These molds are essentially skeleton type bending molds comprising a skeleton framework defining a shaping surface conforming to the ultimate shape desired for the bent glass sheets and encompassing an area including one or more relatively flat portions, the apparatus being adapted for use in transporting glass sheets through a bending lehr provided with glass sheet heating means located above the path of movement of said shaping surface only and further including heat absorbing means located only below said shaping surface in substantial alignment with the one or more relatively flat portions of the area. The heat absorbing means comprise one or more members of high thermal capacity compared to that of an equivalent area of the adjacent glass to be maintained relatively flat.

A principal object of the present invention is to provide a method and apparatus for bending flat glass sheets into complex curvatures where the glass is curved both longitudinally and transversely and includes relatively flat portions.

Another object of the present invention is to provide in glass bending molds means for preventing overbending of certain portions of flat glass sheets while allowing other portions of the sheets to be bent to varying degrees of curvature.

Another object of the present invention is to provide novel outline glass bending molds provided with a heat absorber member aligned below each portion of the area enclosed by the mold where a minimum of glass bending is required.

Another object of the present invention is to provide glass bending molds for bending glass sheets into complex curvatures including relatively flat portions wherein the mold is so constructed free of heat shields that flat glass sheets may be mounted for bending and removed after bending without complicated movement of shields to clear the mold for loading and unloading.

Another object of the present invention is to provide a method for bending glass sheets in pairs wherein the glass is stacked and supported on the mold, heat is imparted to the upper surface of the stack only to soften the glass to the contour of the mold, and heat is abstracted from the bottom surface only in those portions requiring minimum curving.

Another object of the present invention is to provide novel glass bending molds of the skeleton type for producing non-uniform curvatures wherein the mold comprises a skeleton framework defining a shaping surface conforming to the ultimate shape desired for bent glass sheets and encompassing an area including a relatively flat portion, said apparatus adapted for use in transporting glass sheets through a bending lehr provided with glass sheet heating means located above the path of movement of said shaping surface only and further including heat absorbing means located only below said shaping surface in substantial alignment with said relatively flat portion of said area, whereby loading and unloading of the glass sheets is facilitated.

These and other objects of the present invention will become obvious upon study of the following description of particular embodiments of the invention taken in conjunction with the accompanying drawings. A recitation of the embodiments described is for purpose of illustration rather than limitation.

In the drawings, wherein like reference numbers refer to like structural elements:

FIG. 11 is an elevational view, partly in perspective, of an embodiment of a glass sheet bending mold exemplifying an illustrative embodiment of the present invention for producing a twin-wrap bend shown in the open position preparatory to receive a glass sheet for bending;

FIG. 12 is a view similar to FIG. 11 showing the mold in its closed position forming a continuous frame whose upper shaping surface conforms in elevation and outline to a contour desired for the bent glass sheet; and FIG. 13 is a plan view partially in perspective of the mold as seen in FIG. 12.

Figure 1:
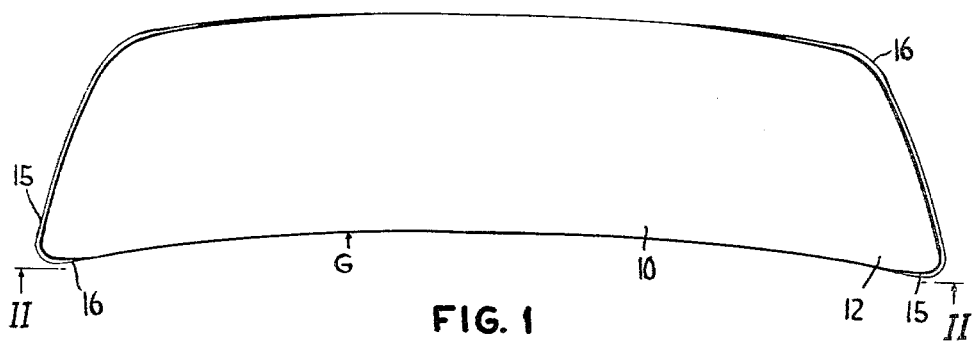
FIG. 1 is a plan view of a portion of a sheet of glass bent according to present day requirements.
Figure 2:
FIG. 2 is a view at right angles to FIG. 1 along the lines II—II thereof.

Referring to the drawings, FIGS. 1 and 2 depict a glass sheet G having a central portion 10 of relatively shallow curvature, merging into areas 12 where the radius diminishes rapidly and end sections 14 having one side edge 15 relatively flat and another side edge 16 relatively curved. Such a sheet of glass is required to be bent cylindrically in its central portion 10 along a fairly shallow curvature merging into cylindrical bends at the portions 12 of increasingly sharper curvature. The end portions 14 are bent to complex bends comprising both longitudinal and transverse curvatures and are twisted with respect to the center portion.

Figure 3:
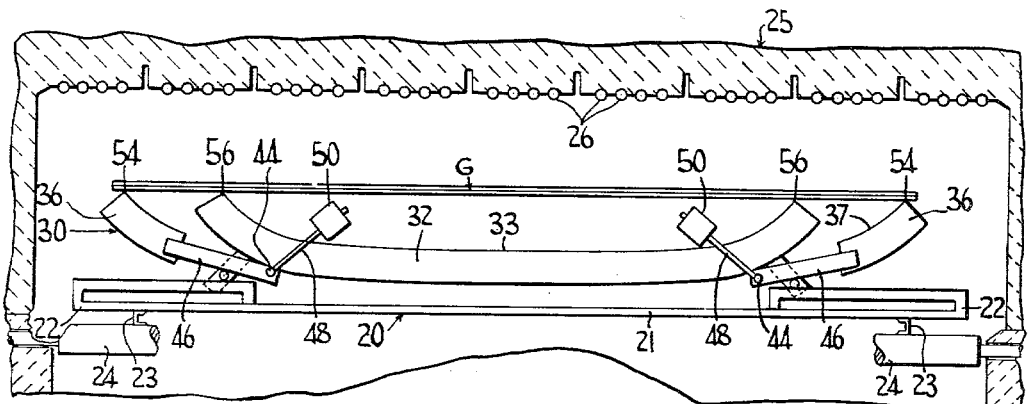
FIG. 3 is a side elevational view of a typical mold shown in the open position supporting a sheet of flat glass for bending into a wrap-around shape.
Figure 4:
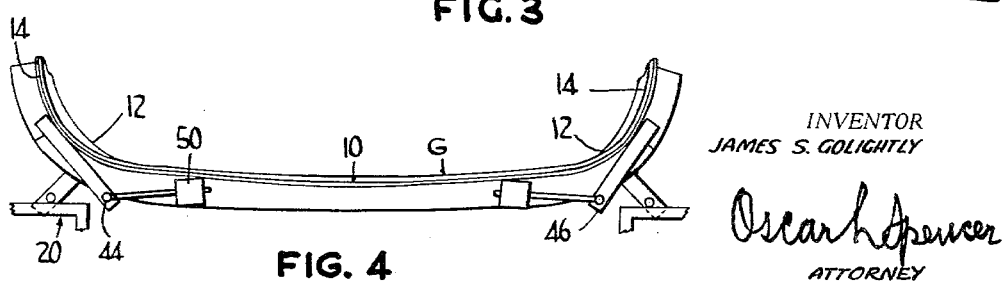
FIG. 4 is a partial side elevational view of the mold of FIG. 3 showing the latter in closed position containing a bent sheet of glass.
Figure 5:
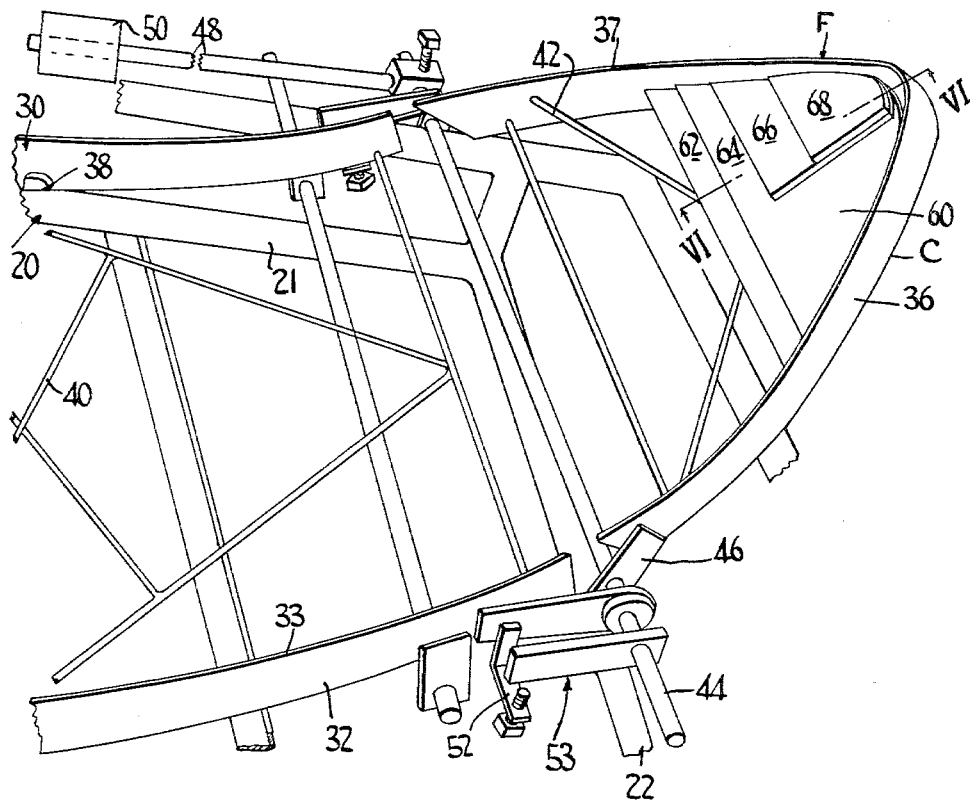
FIG. 5 is an isometric view of a portion of the mold depicted in FIGS. 3 and 4 showing the details of an embodiment of the present invention.

Referring to FIGS. 3, 4, and 5, reference number 20 depicts a mold carrying frame provided with a pair of spaced longitudinal side members 21 of L-shaped configuration and a pair of cross members 22 connecting the ends of the side members. The cross members also may be L-shaped in configuration for additional rigidity. Transverse rails 23 are adapted to ride on conveyor rolls 24 of a glass bending lehr, shown generally at 25. The lehr is provided with overhead electrical heaters 26 located only above the path of movement of the glass through the lehr.

A mold 30 comprising a central molding member 32 and end mold members 36 is supported by fixed attachment of its central mold member to the mold supporting frame 20. The upper surface 33 of the main central portion 32 and the upper surface 37 of the end mold members 36 are shaped to the contour desired for the corresponding portions of the bent glass sheet. Transversely extending braces 40 interconnect the opposing sides of center section 32, while similar braces 42 interconnect the opposing longitudinal sides of the wing members 36 to improve the rigidity of the mold structure. These braces are preferably removed as far as possible from surfaces 33 and 37 in order to minimize localized heat variations to which adjacent portions of the glass sheet are subjected.

End mold members 36 are pivoted about pivots 44. Extensions 46 may be attached to each end mold member 36 in order to provide a pivotal connection, or the pivots may be attached directly to the end mold members, depending on the curved shape required for the glass. A lever arm 48 provided with a weight 50 is attached to the end mold member 36 in such a manner that the weight 50 counterbalances the weight of its end mold member 36 about the pivot 44.

When the mold is not subjected to a load, such as a flat glass sheet, the mold tends to be in a closed position whereby the end mold members 36 are rotated into the position depicted in FIG. 4. In this position surfaces 37, 33, and 37 form a substantially continuous skeleton frame conforming to the shape desired for a glass sheet to be bent on the mold.

The end mold members 36 are rotatable to an open position such as shown in FIG. 3 to receive a pair of flat sheets of glass. At this open position, the dimensions of the mold are slightly less than those of the flat sheet of glass to be bent, this difference in length or width preferably not exceeding ½ inch. In the open mold position, the flat glass is supported at the outboard extremities 54 of each end mold member 36 and also, preferably, at the outboard extremities 56 of the fixed center mold member 32. Such molds are referred to as center supporting molds in this description.

In operation, a stack of flat sheets of glass G are mounted on the open mold. The glass and the mold are then conveyed into a bending lehr where the glass and the mold are gradually heated to prevent thermal shock. The glass, which was rigid while cold, softens upon the application of heat. The center portion 10 of the glass conforms to the center member 32 of the mold, and the area of contact between the softening glass and the center portion of the mold increases. The weighted lever arms 48 force the extremities 14 of the heat-softened glass G to curl upwardly to conform to surfaces 37 of the mold. A stop member 53 limits the closing movement of the mold by rotating with the end mold member 36 until it contacts set screw 52.

In bending glass sheets where the opposite sides of the longitudinal extremities of the glass are bent to different curvatures, it has been found necessary to impart different degrees of heat to different localized portions of the glass. The center supporting skeleton molds previously utilized are so built that a substantially uniform heat blanket is imparted to the different portions of the glass sheets. Since continuous bending of glass is accomplished by conveying the glass sheets sideways through a bending lehr where heat is applied to flat glass sheets supported on the open mold, it is possible to vary the degree of heat applied to the glass passing through the lehr along the longitudinal but not the transverse axis of the glass by supplying localized heat of different intensity at different locations transversely of the bending lehr. The particular mold shown in FIG. 5 is designed to maintain the shape of the side edge 15 of the glass adjacent portion F of the end mold member 36 flat and to curve the side edge 16 adjacent portion C. In other words, side portion C is twisted with respect to its corresponding opposite side portion F.

According to one embodiment of the present invention, this particular transverse shaping at the longitudinal extremities of the glass is accomplished by attaching a heat absorber member 60 to the skeleton structure of end mold section 36. The heat absorber member 60 may comprise a stack of metal plates 62, 64, 66, and 68 of different cross-sectional areas underlying a portion of the glass where localized differential curvatures are desired. Heat absorbing members 60 behave as heat sinks to absorb a certain proportion of the heat that otherwise would be absorbed by the adjacent portion of the glass sheet to be bent. In regions where the heat absorbing member is relatively thick, such as in the areas adjacent the portion of the heat absorber member whose thickness includes all four plates, a large percentage of heat is preferentially absorbed by the plates rather than the glass because of the high heat capacity of these regions. In the thinner portions of the heat absorbing member having less thermal capacity than that of the relatively thick regions, a greater portion of the heat imparted by the heating elements in the bending lehr is absorbed by the glass. Therefore, the glass bends more rapidly in those regions where there is less preferential heat absorption by the heat absorbing members than where the heat absorbing members remove a greater portion of the heat available for softening the glass. Therefore, the provision of these heat absorbing members 60 enables local portions of glass to be bent to different degrees of curvature.

In cases where glass sheets have very narrow longitudinal extremities, failure to provide these heat absorbing members 60 may result in an excess softening of the glass at their narrow extremities where the surface to volume ratio is greater than at other portions of the glass. Therefore, when heat is applied to the glass, the rotation of the end mold members 36 may tend to cause the longitudinal extremities of the glass to curl to a greater degree than desired. The provision of heat absorber members prevents the extremities from softening too readily upon the application of heat thereto. Since the temperature of the glass tips adjacent the heat absorber members is relatively low due to the presence of heat absorber members at the extremities of the mold, this tendency of the glass sections 14 to overbend is minimized. Thus, the heat absorber members are even useful in those cases where glass sheets having thin, tapering, longitudinal extremities are bent in such a manner that the opposed lateral sides of the extremities are not twisted with respect to each other.

Figure 6:
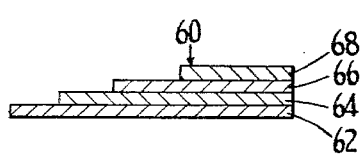
FIG. 6 is a cross-sectional view of an element forming part of the present invention seen along the lines 6—6 of FIG. 5.
Figure 7:
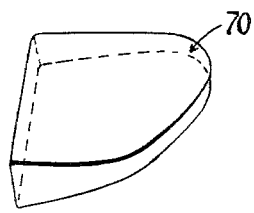
FIG. 7 is an isometric view of an alternate embodiment of an element such as shown in FIG. 6.

Details of two embodiments of a heat absorber member are shown in FIGS. 6 and 7. In FIG. 6, the heat absorber member 60 consists of a series of plates having different cross-sectional areas fixed together to provide different thicknesses in different areas, thus varying the heat absorbing capacity in different areas of the absorber member. While FIG. 5 shows a heat absorber member 60 extending completely across the outboard extremity of end mold members 36, it is understood that the plates may extend only partly across, thereby only partly closing the skeleton framework in that region. Also, as shown in FIG. 7, the heat absorber member may be shaped in the form of a wedge 70 where the thickness gradually tapers or has any configuration necessary to insure the proper selective absorption of heat emanating from overhead heaters in a glass bending lehr.

When a pair of glass sheets are bent simultaneously, according to the present invention, they are stacked on the mold and conveyed laterally through the lehr 25 having heaters 26 disposed above the path of mold movement only, as shown in FIG. 3. Heating the pair from overhead heaters 26 while abstracting heat from below the pair at localized regions to be maintained relatively flat causes the upper sheet of the pair to soften more readily than the bottom sheet. The upper sheet also serves to filter some thermal radiation from the bottom sheet by virtue of its placement between the overhead primary heat source and the bottom sheet. These factors plus the relative proximity of the upper and lower sheets to the primary overhead heat source enhance intimate contact between the sheets during heat sagging. Gaps between the sheets of the pair are minimized and even avoided entirely during the bending operation.

It is preferable to locate the heat absorber members on the side opposite the glass from the overhead source of heat 26 (FIG. 3). If the heat absorber members are located between the sources of heat and the glass, thereby shielding the portion of the glass in the "shadow" of the radiant heaters, a line of demarcation between the shielded and unshielded portions is visible in the bent glass, the glass is liable to break due to the thermal shock resulting from the steep temperature gradient between adjacent shielded and unshielded areas of the sheet, and inefficient utilization of the radiant heaters within the bending lehr results. Also, when pairs of glass sheets are shielded from above, the upper sheet remains stiffer than the lower sheet and does not conform as closely to the bottom sheet of the pair as is the case when apparatus conforming to the present invention is employed.

While the particular embodiments described above disclose the use of heat absorber members at the longitudinal extremities of molds designed to bend glass sheets to longitudinal bends having relatively flat extremities or extremities twisted relative to the remainder of the sheet, it is understood that the principles of the present invention can be equally utilized in inhibiting the bending of other regions of the glass sheet, for example, the central region. For example, if a transverse bend is desired in the region between the sharply bent portions of a non-uniform longitudinal curve, one or more heat absorber members may be employed to underlie one or more portions of the central region of the mold underlying the central portion of the glass desired to be maintained relatively flat.

The unshielded portion of the central section of the glass sheet tends to soften and bend transversely, whereas the portions of the sheet overlying the centrally disposed heat absorber members remain relatively rigid compared to the portion of the central region of the glass sheet from which heat is not absorbed. In this manner, the severity and location of the transverse sag can be closely controlled just as any other region of the glass sheet by localized use of heat absorbers according to the present invention.

Figure 8:
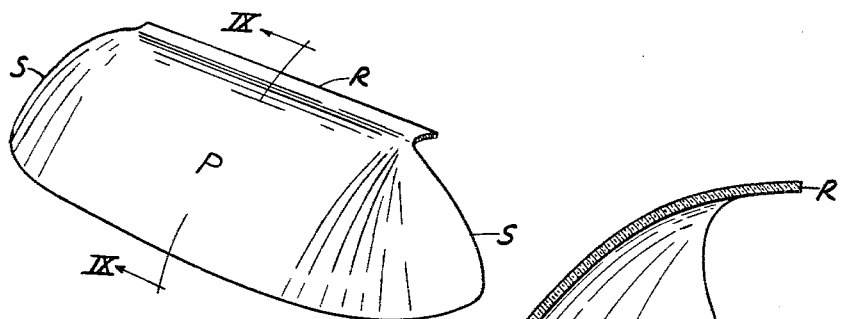
FIG. 8 is a perspective view of a glass sheet illustrative of a twin-wrap windshield.
Figure 9:
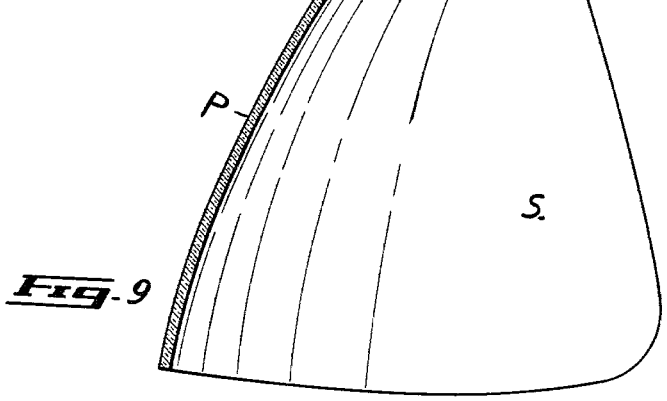
FIG. 9 is a sectional view along the lines IX—IX of FIG. 8.
Figure 10:
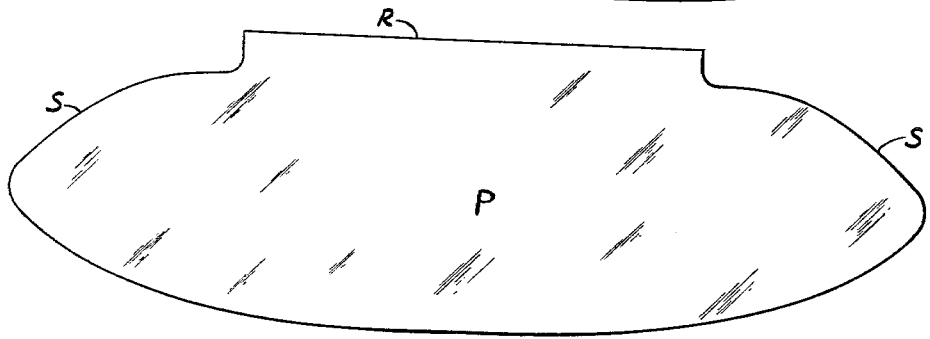
FIG. 10 is a plan view of a flat glass sheet precut for bending to the shape required in FIGS. 8 and 9.

FIGS. 8, 9, and 10 depict a compound windshield whose fabrication is facilitated by an application of the present invention to inhibit the bending of one lateral side of the central portion of the glass sheet while the opposite side is allowed to be bent transversely. According to these drawings, the compoundly bent glass sheet doublet comprises a center portion P terminating in tips S which are bent sharply relative to the central portion P to extend rearwardly at the sides of the automobile and a side extension R which is curved transversely to extend into the vehicle roof.

The mold of this embodiment comprises a carriage frame 120 which includes longitudinally extending angle irons 122 interconnected by transverse angle irons 126. Support rods 130 are provided to support the mold structure in spaced relation above its supporting carriage. An intermediate beam 133 interconnects the transverse angle irons 126.

The mold includes a center mold section 139 comprising a smoothly curved center section rail 140 and a reversely curved center section rail 142, and end mold sections 143 and 144 comprising end section rails 145 and 146 pivoted relative to the central mold section 139 such as in the first embodiment.

Stub hinges 148 are attached to the center section rails 140 and 142. Formed metal straps 149, which are pivoted about stub hinges 148, interconnect lever arms 150 and 151 to the opposite side extremities of the end mold sections 143 and 144. Each lever arm 150 and 151 is counterweighted at 152 to provide a bending moment tending to close the mold.

Each mold section is reinforced with a reinforcing flange 160 at its bottom extremity for reinforcement purposes. Such structure lessens the cross bracing required to reinforce the mold. This particular construction is disclosed and claimed in copending patent application Serial No. 575,736 of Walter W. Barcikowski and Chester W. Sabotka, filed April 3, 1956, now U.S. Patent No. 2,933,856.

Each of the metal straps 149 for lever arms 150 is provided with an extension 155 which is designed to make contact with a stop member 162 similar to one of the stop members 53 of the previous embodiment.

The central mold section is provided with a heat absorber member 164 comprising one or more metal plates 166 fixedly attached by means of support rods 167 to a longitudinally extending angle iron 122 or the intermediate beam 133. The metal plates 166 of the heat absorber member 164 are echeloned for purposes described above for echeloning the plates of heat absorber members 60 of the first embodiment. A screen 168 having a peripheral portion extending laterally inboard beyond the inboard edge of the metal plates 166 may also be incorporated in the heat absorber member.

At the outboard extremities of the mold section, additional heat absorber members 180 and 182 are provided. These latter heat absorbers are supported in fixed position relative to the center mold member 139 from the transverse angle irons 126 by means of a supporting structure, shown generally at 186 as including braces and support rods. As seen particularly in the elevational views of FIGS. 11 and 12, heat absorber members 180 and 182 are constructed and arranged to provide a tapering heat abstraction pattern longitudinally of the glass sheet extremities by virtue of varying the thickness from their relatively thick longitudinally outer extremity to their relatively thin longitudinally inner extremity. The thicker portion of each heat absorber member so constructed has a greater thermal capacity per unit area than the thinner portion and is capable of abstracting more heat from the adjacent portion of the glass sheet than the thinner portion.

The use of fixedly located heat absorber members 180 and 182 is equally applicable to provide the bend illustrated in FIGS. 1 and 2 as well as that illustrated in FIGS. 8 to 10. Heat absorber members fixed in position below the extremities of a sectionalized mold provided with end mold members that lift the glass sheet extremities do not interfere with the rotation of the end mold members 36 or end mold sections 143 and 144 of the molds illustrated.

Using either embodiment of a sectionalized mold of the type described above, the flat glass sheets are initially supported with their longitudinal extremities relatively close to the heat absorber members. Therefore, during the preliminary heating when the glass is below the softening point, the presence of the heat absorbing members adjacent the glass sheet extremities is sufficient to cause the temperature rise of the latter to lag the temperature rise of those regions remote from a heat absorber member.

As the glass sheets are folded upwardly upon the rotation of the end mold sections, the longitudinal extremities of the glass sheets move away from the heat abstractor members, thereby lessening the temperature moderating effect of the heat abstractor members on the glass sheet extremities, thus permitting the glass sheet extremities to reach temperatures within the annealing range but below the softening point of glass. Therefore, while the glass sheets are bent to non-uniform curvatures including relatively flat extremities, the glass sheet extremities are permitted to reach a sufficiently high temperature to permit the entire sheet to anneal properly without introducing steep thermal gradients tending to induce glass fracture resulting from thermal shock.

The embodiment of FIGS. 11 through 13 requires that the transverse bend be localized and spaced laterally inboard of the reversely curved portion delineated by center mold section rail 142. Therefore, the rail 142 is provided with a slide bar 170 which is spaced therefrom and completely embraces the latter and which extends obliquely upwardly and outwardly of the portion of the outline defined by the rail to permit a side edge of the glass sheets to slide transversely of the mold while forming the transverse bend. The bend will be localized laterally of the portion of the glass sheet doublet aligned with the central heat absorber member 164.

The end mold sections 145 and 146 are provided with slide bars 172 and 174, respectively, which are spaced therefrom to embrace the latter and extend slightly beyond the mold extremities 176 and 178, respectively. These latter slide bars permit the glass sheet extremities to slide as the glass sheets are folded upwardly into the longitudinal curve.

A guide 190 which comprises a bent rod 192 attached at its fixed end to a longitudinally extending angle iron 122 and including a ceramic sleeve extending upwardly from the free upturned portion 194 of the rod terminates in the plane of ultimate curvature desired for the transverse sag in the region of maximum sag. Thus, operators attending a bending lehr are able to observe when the transverse bend has been completed and are thus able to adjust the controls in the lehr accordingly in order to insure optimum bends.

While specific constructions have been disclosed to illustrate the heat absorbing members, it is understood that the construction of the heat absorbing members is not necessarily limited to the solid metal plate 60 or 180 or a composite member 164 including a screen and a sheet or a network of delicate threads such as disclosed in aforesaid parent application Serial No. 438,016, but covers any member having a relatively large thermal capacity compared to an equivalent area of glass. Such a heat absorbing member has heat absorbing properties that are capable of abstracting heat from a portion of a sheet of glass being bent in a region where a differential application of heat is required to avoid overbending the glass in this region.

The above description of certain embodiments is for the purpose of illustrating the present invention rather than limitation. Reference to the latter may be obtained from studying the accompanying claims.

What is claimed is:

1. In apparatus for bending glass sheets, an outline type mold comprising a peripheral rail having a curved shaping surface formed thereon for receiving and supporting the marginal portion of a glass sheet bent on said mold, said shaping surface being curved to conform to the curved surface of the bent sheet, a solid heat absorbing member disposed below said shaping surface and occupying a portion of the area below that enclosed within the outline of said shaping surface, said heat absorbing member having a relatively thick portion adjacent said rail and a relatively thin portion, and means for supporting said heat absorbing member in said relation to said shaping rail.

2. In apparatus as in claim 1, wherein said relatively thin portion comprises a screen.

3. In apparatus for bending glass sheets, an outline type mold comprising a plurality of mold sections including an end mold section pivoted for movement between a spread position and a closed position, each of said mold sections having a curved shaping surface formed thereon for receiving and supporting a different portion of the marginal portion of a glass sheet bent on said mold, said shaping surface being curved to conform to the curved surface of the bent sheet, a heat absorbing member disposed below said shaping surface and occupying a portion of the area below that enclosed within said shaping surface portion of said end mold section, means securing said heat absorbing member in fixed position relative to a mold section other than said end mold section, the shaping surface of said end mold section being adjacent and encompassing said heat absorbing member when said end mold section pivots into said spread position and being substantially spaced from said heat absorbing member when said end section pivots into the closed mold position.

4. In apparatus as in claim 3, wherein said heat absorbing member comprises a solid member having a relatively thick portion adjacent said end mold section when the latter pivots into said spread position and a relatively thin portion.

5. In apparatus as in claim 4, wherein said relatively thick portion is located adjacent the outer longitudinal extremity of the end mold section when the latter is pivoted into said spread mold position and a relatively thin portion located longitudinally inwardly of said relatively thick portion.

6. In apparatus as in claim 4, wherein said relatively thick portion is located laterally of said relatively thin portion with respect to the longitudinal axis of the mold.

7. Apparatus for bending glass sheets supported thereon comprising a skeleton framework defining a shaping surface conforming to the ultimate shape desired for bent glass sheets and encompassing an area including a relatively flat portion, said apparatus adapted for use in transporting glass sheets through a bending lehr provided with glass sheet heating means located above the path of movement of said shaping surface only and further including heat absorbing means of nonuniform thickness located only below and in spaced relation to said shaping surface in substantial alignment with said relatively flat portion of said area.

8. Apparatus for bending glass sheets supported thereon comprising a skeleton framework defining a shaping surface conforming to the ultimate shape desired for bent glass sheets and encompassing an area including spaced relatively flat portions, said apparatus adapted for use in transporting glass sheets through a bending lehr provided with glass sheet heating means located above the path of movement of said shaping surface only and further including heat absorbing means located only below and in spaced relation to said shaping surface and comprising a heat absorbing member of nonuniform thickness in substantial alignment with each of said spaced relatively flat portions.

References Cited by the Examiner
UNITED STATES PATENTS 2,348,278 5/44 Boyles et al. _____ 65—288
2,720,729 10/55 Rugg _____ 65—288

DONALL H. SYLVESTER, Primary Examiner.

MORRIS O. WOLK, Examiner.